(12) United States Patent
Yamauchi et al.

(10) Patent No.: US 10,767,782 B2
(45) Date of Patent: Sep. 8, 2020

(54) SOLENOID VALVE

(71) Applicant: SHINWA CONTROLS CO., LTD., Kawasaki-Shi (JP)

(72) Inventors: Hidekazu Yamauchi, Kawasaki (JP); Ryoji Ichiyama, Kawasaki (JP)

(73) Assignee: Shinwa Controls Co., Ltd., Kawasaki-Shi (JP)

( * ) Notice: Subject to any disclaimer, the term of this patent is extended or adjusted under 35 U.S.C. 154(b) by 2 days.

(21) Appl. No.: 16/303,917

(22) PCT Filed: May 25, 2017

(86) PCT No.: PCT/JP2017/019516
§ 371 (c)(1),
(2) Date: Dec. 10, 2018

(87) PCT Pub. No.: WO2017/204290
PCT Pub. Date: Nov. 30, 2017

(65) Prior Publication Data
US 2019/0178405 A1 Jun. 13, 2019

(30) Foreign Application Priority Data

May 25, 2016 (JP) ................................ 2016-103894

(51) Int. Cl.
*F16K 31/06* (2006.01)
(52) U.S. Cl.
CPC ................ *F16K 31/0651* (2013.01)
(58) Field of Classification Search
CPC .......... F16K 31/0651; F16K 31/0658
See application file for complete search history.

(56) References Cited

U.S. PATENT DOCUMENTS 3,125,321 A * 3/1964 Van Domelen ..... F16K 31/0651
  251/129.21
4,575,009 A * 3/1986 Giraudi ................. F02M 51/08
  251/129.21

(Continued)

FOREIGN PATENT DOCUMENTS

| JP | S56-160370 U | 11/1981 |
| JP | 2006-258154 A1 | 9/2006 |
| WO | 2010/113645 A1 | 10/2010 |

OTHER PUBLICATIONS

International Search Report and Written Opinion (Application No. PCT/JP2017/019516) dated Jul. 11, 2017.

*Primary Examiner* — Eric Keasel
(74) *Attorney, Agent, or Firm* — Burr & Brown, PLLC

(57) ABSTRACT

A valve seat, which a valve body of a movable core sits on, protrudes from an outside region of the valve seat located at an end of a columnar body toward the movable core. A gas flow passage in the movable core has: an inflow passage extending on a stationary core side in the direction in which the movable core moves; and two or more outflow passages branched on a valve body side from the inflow passage. A protrusion height of the valve seat is 0.3 times or more an inner diameter of the outflow passages. A gas accumulation space includes: a region located away from the movable core by a distance 0.5 times or more the inner diameter of the outflow passage; and a region located away from the movable core by a distance greater than or equal to the inner diameter of the outflow passage.

9 Claims, 3 Drawing Sheets

(56) References Cited

U.S. PATENT DOCUMENTS

| | | | | |
|---|---|---|---|---|
| 4,653,525 | A | * | 3/1987 | Young ............... F16K 31/06 251/129.21 |
| 5,450,876 | A | * | 9/1995 | Reinicke .......... F16K 31/0651 251/129.21 |
| 6,702,253 | B2 | * | 3/2004 | Noller ............. F16K 31/0651 251/129.21 |
| 2012/0018541 | A1 | | 1/2012 | Kazuma et al. |

* cited by examiner

SOLENOID VALVE

TECHNICAL FIELD

The present invention relates to a type of solenoid valve which is closed in a normal state.

BACKGROUND ART

A conventional solenoid valve, whose type is the above one which is closed in a normal state, is explained with reference to FIG. 3. FIG. 3 is provided based on FIG. 4 of JP 2006-258154 A.

As shown in FIG. 3, a solenoid valve 50 disclosed in JP 2006-258154 A includes: a stationary core 60 having a gas introduction passage 61 inside the stationary core 60, and a movable core 70 having a gas flow passage 71 inside the movable core 70, the movable core 70 being movable toward the stationary core 60 when an electromagnetic force is applied to the movable core 70. A valve body 75 is mounted at an end of the movable core 70 away from the stationary core 60.

A columnar body 80 having a sleeve portion 81 configured to guide a movement of the movable core 70 is fixed to the stationary core 60. A gas discharge passage 82, which is closed when a valve body 75 sits thereon, is provided at an end of the columnar body 80 away from the stationary core 60. The gas discharge passage 82 is formed as a circular (cylindrical) hole.

Between the stationary core 60 and the movable core 70, there is provided a spring 65 configured to bias the movable core 70 in a direction in which the movable core 70 is moved away from the stationary core 60 in order to cause the valve body 75 to sit.

On the other hand, there is provided an electromagnetic coil 73 configured to apply the electromagnetic force to the movable core 70 in order to move the movable core 70 toward the stationary core 60 against a biasing force of the spring 65 such that the valve body 75 is released from the gas discharge passage 82.

The columnar body 80 is generally cylindrical, a region of the movable core 70 on a side of the valve body 75 has a smaller diameter than on a side of the movable core 60, so that a cylindrical gas accumulation space 82 is defined around the valve body 75.

In addition, the gas introduction passage 61 of the stationary core 60 and the gas flow passage 71 of the movable core 70 are configured to maintain a communication state thereof no matter how a relative positional relationship of the stationary core 60 and the movable core 70 is (that is, no matter how an extension or contraction state of the spring 65 is).

In addition, a region of the gas flow passage 71 on a side of the stationary core 60 is one inflow passage 71a having a circular section and extending in a direction in which the movable core 70 moves; and a region of the gas flow passage 71 on a side of the valve body 75 is two outflow passages 71b branched from the inflow passage 71a each of which has a circular section and extends in a direction perpendicular to the inflow passage 71a.

As seen from FIG. 3, the diameter of the section of the inflow passage 71a and the diameter of the section of each outflow passage 71b are substantially the same. In addition, the diameter of the gas discharge passage 82 is also the same as these diameters. On the other hand, a radius difference between the outer diameter of the gas accumulation space 84 (the inner diameter of the columnar body 80) and the valve body 75 is about half the above diameters as seen along a line extended from an opening part of each outflow passage 71b in the direction in which the outflow passage 71b extends.

Next, an operation of the above conventional solenoid valve 50 is explained.

In a normal state, by means of the biasing force of the spring 65 provided between the stationary core 60 and the movable core 70, the movable core 70 is biased in the direction in which the movable core 70 is moved away from the stationary core 60, so that the valve body 75 sits on the gas discharge passage 82 and the gas discharge passage 82 is closed.

When a valve-opening instruction is inputted, the electromagnetic coil 73 is driven by a control unit (not shown). Thus, the electromagnetic coil 73 applies the electromagnetic force to the movable core 70, so that the movable core 70 is moved toward the stationary core 60 against the biasing force of the spring 65. As a result, the valve body 75 is released from the gas discharge passage 82, and the solenoid valve 50 is opened.

When a valve-closing instruction is inputted and the driving of the electromagnetic coil 73 is stopped, the electromagnetic force disappears and the movable core 70 is moved again away from the stationary core 60 by means of the biasing force of the spring 65. As a result, the valve body 75 sits on the gas discharge passage 82 again, and the gas discharge passage 82 is closed.

In view of a gas flow, in a normal state, a gas (normally, a pressurized gas) supplied into the gas introduction passage 61 fills the gas accumulation space 84 via the gas inflow passage 71a and the gas outflow passages 71b of the gas flow passage 71. However, the gas discharge passage 82 is closed by the valve body 75, so that the gas is not discharged via the gas discharge passage 82.

When a valve-opening instruction is inputted and the electromagnetic coil 73 is driven, the valve body 75 is released from the gas discharge passage 82, so that the gas which has filled the gas accumulation space 84 is discharged via the gas discharge passage 82.

Subsequently, when a valve-closing instruction is inputted and the driving of the electromagnetic coil 73 is stopped, the valve body 75 sits on the gas discharge passage 82 again and the gas discharge passage 82 is closed. Then, the gas flow is stopped at the gas accumulation space 64 (the gas discharge via the gas discharge passage 82 is stopped).

The above explained conventional solenoid valve 50 has such a simple structure that it is cheap to manufacture the same and it is relatively easy to install the same.

JP 2006-258154 A is a prior art document, as already explained above.

SUMMARY OF INVENTION

The present inventors have found that there is a great pressure loss of the gas when the conventional solenoid valve 50 explained with reference to FIG. 3 is opened.

According to the present inventors, since the angle between each gas outflow passage 71b and the gas inflow passage 71a is a right angle, a pressure loss when the gas flows from the gas inflow passage 71a to the gas outflow passages 71b is great (a type of pressure loss generally called as "bending loss"). In addition, according to the present inventors, since the gas accumulation space 84 is narrow, a pressure loss when the gas flows from the gas outflow passages 71*b* to the gas accumulation space 84 is also great (another type of pressure loss generally called as "contraction loss").

Under such circumstances, the present inventors have intensively studied the matters of maintaining an angle of each gas outflow passage 71*a* with respect to the gas inflow passage 71*a* within an acute angle and expanding the gas accumulation space 84, while manufacturing various solenoid valves by way of trial.

During such studies and trials, the present inventors have found that the pressure loss characteristics of the gas when the valve is opened can be remarkably improved by protruding a valve seat, on which the valve body 75 is to sit, from the end of the columnar body 80 toward the valve body 75 so that a region around the protruded valve seat forms a part of the gas accumulation space.

The present invention has been made based on the above findings. The object of the present invention is to provide a solenoid valve which can improve pressure loss characteristics of a gas when the solenoid valve is opened.

The present invention is a solenoid valve comprising:

a stationary core having a gas introduction passage inside the stationary core, a movable core having a gas flow passage inside the movable core, the movable core being movable toward the stationary core when an electromagnetic force is applied to the movable core, a valve body provided at an end of the movable core away from the stationary core, a cylindrical body fixed to the stationary core and configured to guide a movement of the movable core, an annular valve seat provided at an end of the columnar body away from the stationary core, the valve body being able to sit on the annular valve seat, a gas discharge passage provided at an inside region of the valve seat at the end of the columnar body, an elastic member configured to bias the movable core in a direction in which the movable core is moved away from the stationary core in order to cause the valve body to sit on the valve seat, and an electromagnetic coil configured to apply the electromagnetic force to the movable core in order to move the movable core toward the stationary core against a biasing force of the elastic member such that the valve body is released from the valve seat, wherein the columnar body has an annular gas accumulation space in a vicinity of the valve body of the movable core, the valve seat protrudes from an outside region of the valve seat at the end of the columnar body toward the stationary core, the gas introduction passage and the gas flow passage are configured to maintain a communication state thereof no matter how a relative positional relationship thereof is, the gas flow passage has: an inflow passage extending on a stationary core side in the direction in which the movable core moves; and two or more outflow passages branched on a valve body side from the inflow passage each of which extends in a direction forming an acute angle relative to the direction in which the movable core moves, for each outflow passage, a maximum inner diameter is defined in a cross section perpendicular to a direction in which the outflow passage extends, each outflow passage has a stationary-core-side edge and a valve-body-side edge at an opening part thereof from the movable core, a distance by which the movable core is caused to move by the electromagnetic coil is within a range of 0.1 times to 0.3 times the maximum inner diameter, a protrusion height of the valve seat is 0.3 times or more the maximum inner diameter, and the gas accumulation space is formed such that, in a state in which the valve body sits on the valve seat, the gas accumulation space includes (1) a region located away from the movable core by a distance 0.5 times or more the maximum inner diameter, as seen along a line extended from the stationary-core-side edge of each outflow passage in the direction in which the outflow passage extends, and (2) a region located away from the movable core by a distance greater than or equal to the maximum inner diameter, as seen along a line extended from the valve-body-side edge of each outflow passage in the direction in which the outflow passage extends.

According to the present invention, since the angle between the gas inflow passage and each gas outflow passage of the gas flow passage in the movable core is an acute angle, it is possible to inhibit a type of pressure loss of a gas called as "bending loss", as compared with the conventional art in which the above angle is a right angle.

In addition, according to the present invention, since the gas accumulation space is formed such that, in a state in which the valve body sits on the valve seat, the gas accumulation space includes: the region located away from the movable core by a distance 0.5 times or more the maximum inner diameter of each gas outflow passage, as seen along the line extended from the stationary-core-side edge of the outflow passage in the direction in which the outflow passage extends; and the region located away from the movable core by a distance greater than or equal to the maximum inner diameter of each gas outflow passage, as seen along the line extended from the valve-body-side edge of the outflow passage in the direction in which the outflow passage extends, it is possible to inhibit another type of pressure loss of a gas called as "contraction loss", as compared with the conventional art in which the gas accumulation space is narrower.

Furthermore, according to the present invention, since the protrusion height of the valve seat is 0.3 times or more the maximum inner diameter of the outflow passage so that a region around the protruded valve seat forms a part of the gas accumulation space, when the solenoid valve is opened under the condition wherein the movable core moves within a range of 0.1 times to 0.3 times the maximum inner diameter of the outflow passage, the gas can be smoothly discharged. As a result, the pressure loss characteristics of the gas can be remarkably improved.

According to the findings of the present inventors, it is preferable that when the outflow passages are two outflow passages branched from the inflow passage in symmetric directions, a cross-sectional area of each outflow passage perpendicular to a direction in which the outflow passage extends is substantially equal to a cross-sectional area of the inflow passage perpendicular to a direction in which the inflow passage extends. Specifically, it is preferable that the cross-sectional area of each outflow passage perpendicular to a direction in which the outflow passage extends is 0.9 times to 1.1 times the cross-sectional area of the inflow passage perpendicular to a direction in which the inflow passage extends. When this condition is satisfied, the pressure loss characteristics of the gas are good.

In addition, according to the findings of the present inventors, it is preferable that a cross-sectional area of the gas discharge passage perpendicular to a direction in which the gas discharge passage extends is 0.8 times to 1.2 times a cross-sectional area of the inflow passage perpendicular to a direction in which the inflow passage extends, at least over a length 1.5 times of the maximum inner diameter from the valve seat. When this condition is satisfied, the pressure loss characteristics of the gas in the gas discharge passage are good.

In addition, it is preferable that the columnar body is formed by separate members, the valve seat is formed on one of the separate members, and another of the separate members is configured to guide the movement of the movable core. The valve seat requires durability regarding the contact with the valve body. Thus, it is preferable to put priority on such characteristics when selecting material of the member on which the valve seat is formed.

For example, an outside profile shape of the valve seat is a frustoconical shape having an apex angle of 45 degrees to 75 degrees. In this case, the outside profile shape of the valve seat is symmetric around an axis of the valve seat. In addition, in this case, it is preferable that the gas accumulation space has also a shape of rotational symmetry around the axis of the valve seat. When this condition is satisfied, the pressure loss characteristics of the gas are good.

In addition, it is preferable that an outer diameter of the gas accumulation space is substantially uniform in the direction in which the movable core moves, and an end surface of the gas accumulation space away from the stationary core is flat except for the valve seat. When this condition is satisfied, it is relatively easy to design and manufacture the solenoid valve, space saving can be also achieved, and the pressure loss characteristics of the gas are good.

In addition, according to the findings of the present inventors, it is particularly preferable that:

the protrusion height of the valve seat is 0.5 times or more the maximum inner diameter, and the gas accumulation space is formed such that, in a state in which the valve body sits on the valve seat, the gas accumulation space includes (1) a region located away from the movable core by a distance 0.8 times or more the maximum inner diameter, as seen along a line extended from the stationary-core-side edge of each outflow passage in the direction in which the outflow passage extends, and (2) a region located away from the movable core by a distance 1.5 times or more the maximum inner diameter, as seen along a line extended from the valve-body-side edge of each outflow passage in the direction in which the outflow passage extends.

When the above condition is satisfied, the pressure loss characteristics of the gas were particularly good.

The acute angle may be suitably selected from a range of 25 degrees to 75 degrees.

According to the present invention, since the angle between the gas inflow passage and each gas outflow passage of the gas flow passage in the movable core is an acute angle, it is possible to inhibit a type of pressure loss of a gas called as "bending loss", as compared with the conventional art in which the above angle is a right angle.

In addition, according to the present invention, since the gas accumulation space is formed such that, in a state in which the valve body sits on the valve seat, the gas accumulation space includes: the region located away from the movable core by a distance 0.5 times or more the maximum inner diameter of each gas outflow passage, as seen along the line extended from the stationary-core-side edge of the outflow passage in the direction in which the outflow passage extends; and the region located away from the movable core by a distance greater than or equal to the maximum inner diameter of each gas outflow passage, as seen along the line extended from the valve-body-side edge of the outflow passage in the direction in which the outflow passage extends, it is possible to inhibit another type of pressure loss of a gas called as "contraction loss", as compared with the conventional art in which the gas accumulation space is narrower.

Furthermore, according to the present invention, since the protrusion height of the valve seat is 0.3 times or more the maximum inner diameter of the outflow passage so that a region around the protruded valve seat forms a part of the gas accumulation space, when the solenoid valve is opened under the condition wherein the movable core moves within a range of 0.1 times to 0.3 times the maximum inner diameter of the outflow passage, the gas can be smoothly discharged. As a result, the pressure loss characteristics of the gas can be remarkably improved.

DESCRIPTION OF EMBODIMENTS

An embodiment of the present invention will be described below with reference to the attached drawings.

Figure 1:
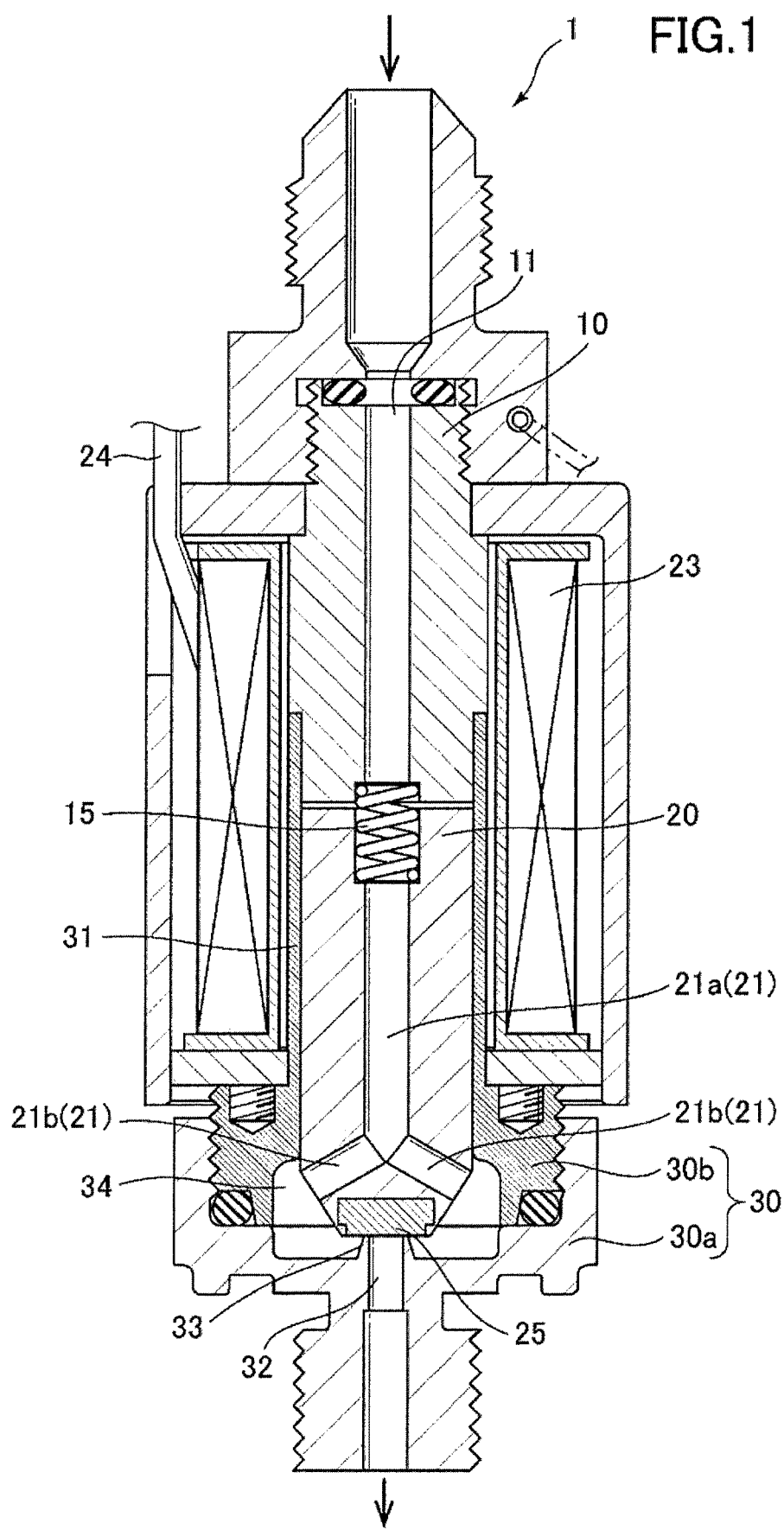
FIG. 1 is a schematic sectional view of a solenoid valve according to an embodiment of the present invention.
Figure 2:
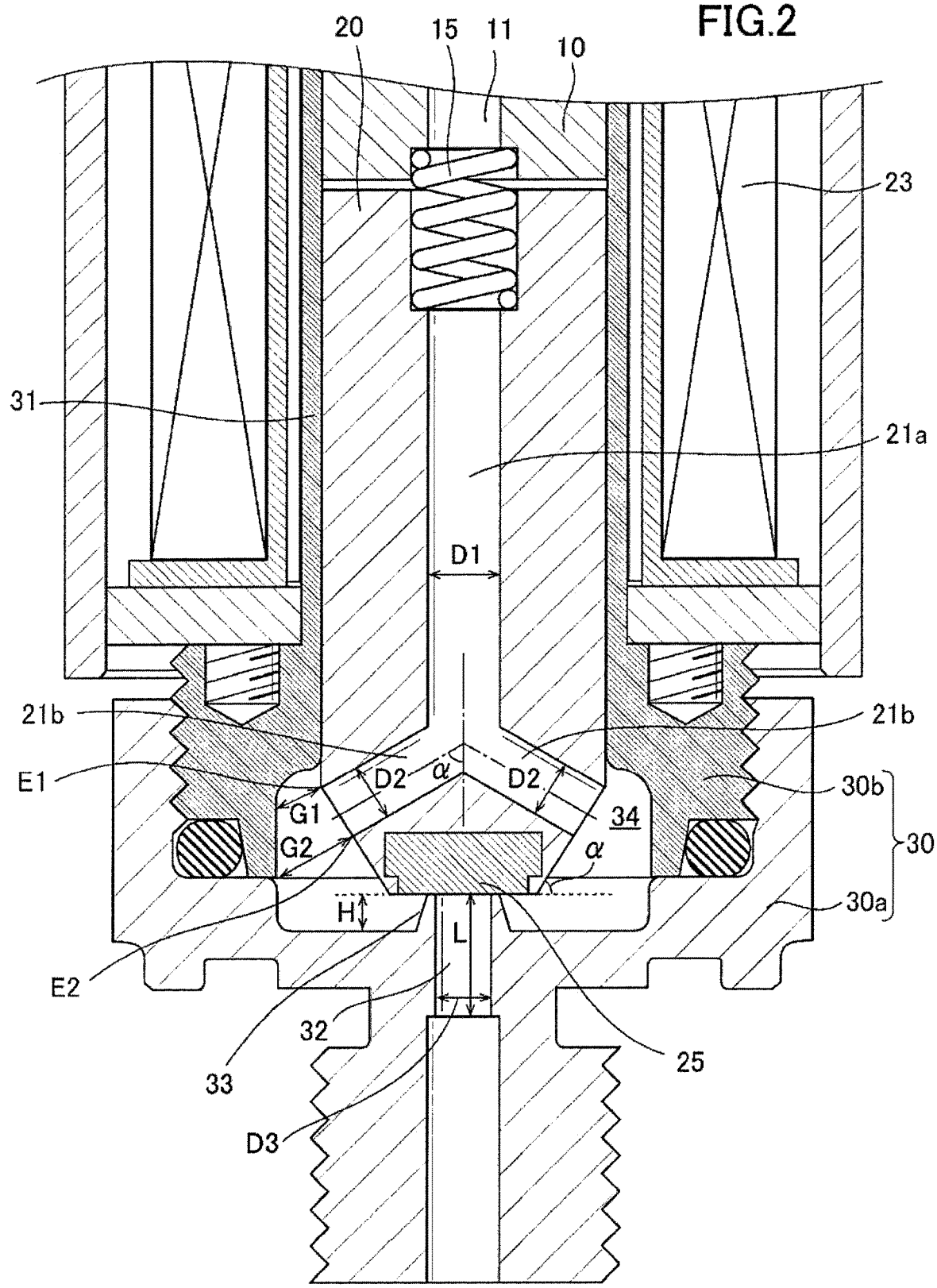
FIG. 2 is an enlarged view of a vicinity of a gas accumulation space shown in FIG. 1.
Figure 3:
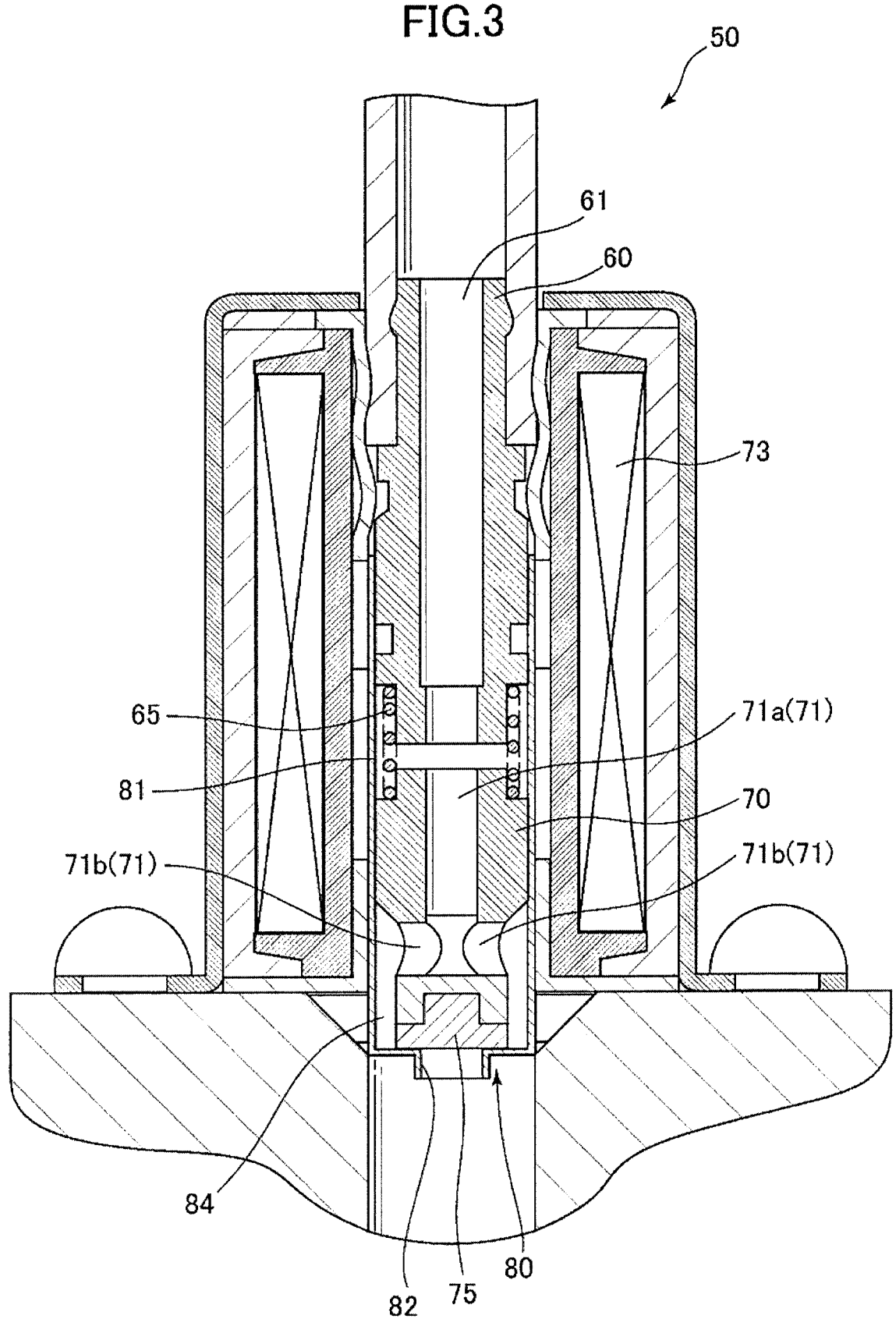
FIG. 3 is a schematic sectional view of a conventional solenoid valve.

FIG. 1 is a schematic sectional view of a solenoid valve according to an embodiment of the present invention, and FIG. 2 is an enlarged view of a vicinity of a gas accumulation space shown in FIG. 1.

As shown in FIGS. 1 and 2, a solenoid valve 1 of the present embodiment includes: a stationary core 10 having a gas introduction passage 11 inside the stationary core 10, and a movable core 20 having a gas flow passage 21 inside the movable core 20, the movable core 20 being movable toward the stationary core 10 when an electromagnetic force is applied to the movable core 20. A valve body 25 is mounted at an end of the movable core 20 away from the stationary core 10.

A columnar body 30 having a sleeve portion 31 configured to guide a movement of the movable core 20 is fixed to the stationary core 10. An annular valve seat 33, on which the valve body 25 is to sit, is provided at an end of the columnar body 30 away from the stationary core 10. The valve seat 33 protrudes from an outside region of the valve seat 33 at the end of the columnar body 30 toward the stationary core 10. An outside profile shape of the valve seat 33 of the present embodiment is a frustoconical shape having an apex angle of 65 degrees, with the outer diameter of a top surface thereof being 2.5 mm and the outer diameter of a bottom surface thereof being 2.9 mm.

A gas discharge passage 32, whose section is circular, is provided at an inside region of the valve seat 33 at the end of the columnar body 30. The gas discharge passage 32 is closed in a normal state wherein the valve body 25 sits on the valve seat 33.

Between the stationary core 10 and the movable core 20, there is provided a spring 15 configured to bias the movable core 20 in a direction in which the movable core 20 is moved away from the stationary core 10 in order to cause the valve body 25 to sit on the valve seat 33. The spring 15 may be replaced with another kind of elastic member that can achieve the same function.

On the other hand, there is provided an electromagnetic coil 23 configured to apply the electromagnetic force to the movable core 20 in order to move the movable core 20 toward the stationary core 10 against a biasing force of the spring 15 such that the valve body 25 is released from the valve seat 33 (gas discharge passage 32). The electromagnetic coil 23 is connected to a control unit (not shown) via a wire 24.

The columnar body 30 has an annular gas accumulation space 34 in a vicinity of the valve body 25 of the movable core 20. The annular gas accumulation space 34 has a shape of rotational symmetry around an axis of the valve seat 33. The details of the shape of the annular gas accumulation space 34 are explained later.

In addition, as shown in FIGS. 1 and 2, the gas introduction passage 11 of the stationary core 10 and the gas flow passage 21 of the movable core 20 are configured to maintain a communication state thereof no matter how a relative positional relationship of the stationary core 10 and the movable core 20 is (that is, no matter how an extension or contraction state of the spring 15 is).

In addition, a region of the gas flow passage 21 on a side of the stationary core 10 is one inflow passage 21a having a circular section and extending in a direction in which the movable core 20 moves; and a region of the gas flow passage 21 on a side of the valve body 25 is two outflow passages 21b axisymmetrically branched from the inflow passage 21a each of which has a circular section and extends in a direction forming an acute angle α (60 degrees in the present embodiment) relative to the inflow passage 21a. As shown in FIG. 2, a region of the movable core 20, at which the outflow passages 21b are opened, is tapered (frustoconical) by the acute angle α.

In the present embodiment, as seen from FIGS. 1 and 2, a diameter D1 of a cross section of the inflow passage 21a perpendicular to a direction in which the inflow passage 21a extends and a diameter D2 of a cross section of each outflow passage 21b perpendicular to a direction in which the outflow passage 21b extends are equal to each other. In addition, a diameter D3 of a cross section of the gas discharge passage 32 perpendicular to a direction in which the gas discharge passage 32 extends is also the same as these diameters D1, D2. Specifically, each of the diameters D1 to D3 is 2.3 mm.

On the other hand, an outer diameter of the gas accumulation space 34 is greater than an inner diameter (for example, 10 mm) of the sleeve portion 31 of the columnar body 30. The outer diameter of the gas accumulation space 34 of the present embodiment is substantially uniform in the direction in which the movable core 20 moves, and is 12 mm for example. In addition, as shown in FIGS. 1 and 2, an end surface of the gas accumulation space 34 away from the stationary core 10 is flat except for the valve seat 33, so that a protrusion height H of the valve seat 33 is defined.

In addition, in the present embodiment, the protrusion height H of the valve seat 33 is 1.15 mm, which corresponds to 0.5 times the diameter D2 of the outflow passage 21b (which may be replaced with a maximum inner diameter of the outflow passage 21b if the section of the outflow passage 21b is not circular).

The gas accumulation space 34 of the present embodiment is formed such that, in a state in which the valve body 25 sits on the valve seat 33 (state as shown in FIGS. 1 and 2), the gas accumulation space 34 includes (1) a region located away from the movable core 20 by 1.8 mm, which corresponds to a distance 0.8 times the inner diameter D2 of the outflow passage 21b (which may be replaced with a maximum inner diameter of the outflow passage 21b if the section of the outflow passage 21b is not circular), as seen along a line (sign G1 in FIG. 1) extended from a stationary-core-side edge E1 of each outflow passage 21b in the direction in which the outflow passage 21b extends, and (2) a region located away from the movable core 20 by 3.5 mm, which corresponds to a distance 1.5 times the inner diameter D2 of the outflow passage 21b (which may be replaced with a maximum inner diameter of the outflow passage 21b if the section of the outflow passage 21b is not circular), as seen along a line (sign G2 in FIG. 2) extended from a valve-body-side edge E2 of each outflow passage 21b in the direction in which the outflow passage 21b extends.

In addition, in the present embodiment, the diameter D3 and a cross-sectional area of the cross section of the gas discharge passage 32 perpendicular to the direction in which the gas discharge passage 32 extends are the same as the diameter D1 and a cross-sectional area of the inflow passage 21a, at least over a length (sign L in FIG. 2) 2.0 times of the diameter D2 of the outflow passage 21b (which may be replaced with a maximum inner diameter of the outflow passage 21b if the section of the outflow passage 21b is not circular) from the top surface of the valve seat 33.

In addition, in the present embodiment, a distance by which the movable core 20 is caused to move by the electromagnetic coil 23 is 0.5 mm, which corresponds to 0.2 times the diameter D2 of the outflow passage 21b (which may be replaced with a maximum inner diameter of the outflow passage 21b if the section of the outflow passage 21b is not circular).

Furthermore, the columnar body 30 of the present embodiment consists of separate members 30a, 30b, which are threadedly joined to each other, the valve seat 33 being formed on one member 30a, the sleeve portion 31 being formed on the other member 30b.

Next, an operation of the present embodiment is explained.

In a normal state, by means of the biasing force of the spring 15 provided between the stationary core 10 and the movable core 20, the movable core 20 is biased in the direction in which the movable core 20 is moved away from the stationary core 10, so that the valve body 25 sits on the valve seat 33 and the gas discharge passage 32 is closed.

When a valve-opening instruction is inputted, the electromagnetic coil 23 is driven by a control unit (not shown). Thus, the electromagnetic coil 23 applies the electromagnetic force to the movable core 20, so that the movable core 20 is moved toward the stationary core 10 against the biasing force of the spring 15. As a result, the valve body 25 is released from the gas discharge passage 32, and the solenoid valve 1 is opened.

When a valve-closing instruction is inputted and the driving of the electromagnetic coil 23 is stopped, the electromagnetic force disappears and the movable core 20 is moved again away from the stationary core 10 by means of the biasing force of the spring 15. As a result, the valve body 25 sits on the valve seat 33 again, and the gas discharge passage 32 is closed.

In view of a gas flow, in a normal state, a gas (normally, a pressurized gas) supplied into the gas introduction passage 11 fills the gas accumulation space 34 via the gas inflow passage 21a and the gas outflow passages 21b of the gas flow passage 21. However, the gas discharge passage 32 is closed by the valve body 25, so that the gas is not discharged via the gas discharge passage 32.

When a valve-opening instruction is inputted and the electromagnetic coil 23 is driven, the valve body 25 is released from the valve seat 33 so that the gas which has filled the gas accumulation space 34 is discharged via the gas discharge passage 32.

Herein, according to the present embodiment, since the angle between the gas inflow passage 21a and each gas outflow passage 21b of the gas flow passage 21 in the movable core 20 is an acute angle α, it is possible to inhibit a type of pressure loss of a gas called as "bending loss", as compared with the conventional art in which the above angle is a right angle. The acute angle α in the present embodiment is 60 degrees. However, the acute angle α may be suitably selected from a range of 25 degrees to 75 degrees.

In addition, according to the present embodiment, the gas accumulation space 34 is formed such that, in a state in which the valve body 25 sits on the valve seat 33, the gas accumulation space 34 includes (1) the region located away from the movable core 20 by the distance 0.8 times the inner diameter D2 of the outflow passage 21b (which may be replaced with a maximum inner diameter of the outflow passage 21b if the section of the outflow passage 21b is not circular), as seen along the line extended from the stationary-core-side edge E1 of each outflow passage 21b in the direction in which the outflow passage 21b extends, and (2) the region located away from the movable core 20 by the distance 1.5 times the inner diameter D2 of the outflow passage 21b (which may be replaced with a maximum inner diameter of the outflow passage 21b if the section of the outflow passage 21b is not circular), as seen along the line extended from the valve-body-side edge E2 of each outflow passage 21b in the direction in which the outflow passage 21b extends. Therefore, it is possible to inhibit another type of pressure loss of a gas called as "contraction loss", as compared with the conventional art in which the gas accumulation space is narrower.

According to the findings of the present inventors, when the gas accumulation space 34 includes (1) a region located away from the movable core 20 by a distance 0.5 times or more the inner diameter D2 of the outflow passage 21b, as seen along the line extended from the stationary-core-side edge E1 of each outflow passage 21b in the direction in which the outflow passage 21b extends, and (2) a region located away from the movable core 20 by a distance 1.0 times or more the inner diameter D2 of the outflow passage 21b, as seen along the line extended from the valve-body-side edge E2 of each outflow passage 21b in the direction in which the outflow passage 21b extends, an effect that the pressure loss of the gas called as "contraction loss" is inhibited can be seen.

According to the further findings of the present inventors, when the gas accumulation space 34 includes (1) a region located away from the movable core 20 by a distance 0.8 times or more the inner diameter D2 of the outflow passage 21b, as seen along the line extended from the stationary-core-side edge E1 of each outflow passage 21b in the direction in which the outflow passage 21b extends, and (2) a region located away from the movable core 20 by a distance 1.5 times or more the inner diameter D2 of the outflow passage 21b, as seen along the line extended from the valve-body-side edge E2 of each outflow passage 21b in the direction in which the outflow passage 21b extends, an effect that the pressure loss of the gas called as "contraction loss" is inhibited can be remarkably seen.

Furthermore, according to the present embodiment, since the protrusion height H of the valve seat 33 is 0.5 times the inner diameter D2 of the outflow passage 21b so that a region around the protruded valve seat 33 forms a part of the gas accumulation space 34, when the solenoid valve is opened under the condition wherein the movable core 20 moves by a distance about 0.2 times the inner diameter D2 of the outflow passage 21b, the gas can be smoothly discharged. As a result, the pressure loss characteristics of the gas can be remarkably improved.

According to the findings of the present inventors, when the protrusion height H of the valve seat 33 is 0.3 times or more the inner diameter D2 of the outflow passage 21b, an effect that the pressure loss characteristics of the gas are improved can be seen.

According to the further findings of the present inventors, when the protrusion height H of the valve seat 33 is 0.5 times or more the inner diameter D2 of the outflow passage 21b, an effect that the pressure loss characteristics of the gas are improved can be remarkably seen.

In addition, in the present embodiment, the conditions that the two outflow passages 21b are axisymmetrically branched from the inflow passage 21a and that the diameter D1 of the cross section of the inflow passage 21a perpendicular to the direction in which the inflow passage 21a extends and the diameter D2 of the cross section of each outflow passage 21b perpendicular to the direction in which the outflow passage 21b extends are equal to each other, are also considered to contribute to the effect that the pressure loss characteristics of the gas are good.

In addition, in the present embodiment, the condition that the diameter D3 of the cross section of the gas discharge passage 32 perpendicular to the direction in which the gas discharge passage 32 extends is the same as the diameter D1 over the length 2.0 times of the diameter D2 of the outflow passage 21b from the top surface of the valve seat 33, is also considered to contribute to the effect that the pressure loss characteristics of the gas are good.

According to the findings of the present inventors, when the diameter D3 (or the cross-sectional area) of the cross section of the gas discharge passage 32 perpendicular to the direction in which the gas discharge passage 32 extends is 0.8 times to 1.2 times the diameter D1 (or the cross-sectional area of the inflow passage 21a) over a length 1.5 times or more the diameter D2 of the outflow passage 21b (which may be replaced with a maximum inner diameter of the outflow passage 21b if the section of the outflow passage 21b is not circular) from the top surface of the valve seat 33, he pressure loss characteristics of the gas are good.

In addition, in the present embodiment, the columnar body 30 consists of the separate members 30a, 30b, the valve seat 33 being formed on the one member 30a, the sleeve portion 31 configured to guide the movement of the movable core 20 being formed on the other member 30b. For example, the valve seat 33 requires durability regarding the contact with the valve body 25. Thus, priority may be put on such characteristics when selecting material of the member 30a on which the valve seat 33 is formed.

In addition, in the present embodiment, the outside profile shape of the valve seat 33 is a frustoconical shape having an apex angle of 65 degrees, and the gas accumulation space 34 has also a shape of rotational symmetry around the axis of the valve seat 33. This is also considered to contribute to the effect that the pressure loss characteristics of the gas are good.

In addition, in the present embodiment, the outer diameter of the gas accumulation space 34 is substantially uniform in the direction in which the movable core 20 moves, and the end surface of the gas accumulation space 34 away from the stationary core 10 is flat except for the valve seat 33. Thereby, it is relatively easy to design and manufacture the solenoid valve, space saving can be also achieved, and the pressure loss characteristics of the gas are good.

NUMERICAL SIGNS 1 solenoid valve
10 stationary core
11 gas introduction passage
15 spring
20 movable core
21 gas flow passage
21a inflow passage
21b outflow passage
23 electromagnetic coil
24 wire
25 valve body
30 columnar body
30a member on which valve seat is formed
30b member on which sleeve portion is formed
31 sleeve portion
32 gas discharge passage
33 valve seat
34 gas accumulation space
D1 diameter of inflow passage
D2 diameter of outflow passage
D3 diameter of gas discharge passage
E1 stationary-core-side edge of outflow passage
E2 valve-body-side edge of outflow passage
G1 spacing distance from stationary-core-side edge of outflow passage in direction in which outflow passage extends
G2 spacing distance from valve-body-side edge of outflow passage in direction in which outflow passage extends
H protrusion height of valve seat
L length in which inner diameter of gas discharge passage is equal to inner diameter of outflow passage
50 conventional solenoid valve
60 stationary core
61 gas introduction passage
65 spring
70 movable core
71 gas flow passage
71a inflow passage
71b outflow passage
73 electromagnetic coil
75 valve body
80 columnar body
81 sleeve portion
82 gas discharge passage
84 gas accumulation space

What is claimed is:

1. A solenoid valve comprising:
a stationary core having a gas introduction passage inside the stationary core,
a movable core having a gas flow passage inside the movable core, the movable core being movable toward the stationary core when an electromagnetic force is applied to the movable core,
a valve body provided at an end of the movable core away from the stationary core,
a columnar body fixed to the stationary core and configured to guide a movement of the movable core,
an annular valve seat provided at an end of the columnar body away from the stationary core, the valve body being able to sit on the annular valve seat,
a gas discharge passage provided at an inside region of the valve seat at the end of the columnar body,
an elastic member configured to bias the movable core in a direction in which the movable core is moved away from the stationary core in order to cause the valve body to sit on the valve seat, and
an electromagnetic coil configured to apply the electromagnetic force to the movable core in order to move the movable core toward the stationary core against a biasing force of the elastic member such that the valve body is released from the valve seat,
wherein
the columnar body has an annular gas accumulation space,
the valve seat protrudes from an outside region of the valve seat at the end of the columnar body toward the stationary core,
the gas introduction passage and the gas flow passage are configured to maintain a communication state thereof no matter how a relative positional relationship thereof is,
the gas flow passage has: an inflow passage extending on a stationary core side in the direction in which the movable core moves; and two or more outflow passages branched on a valve body side from the inflow passage each of which extends in a direction forming an acute angle relative to the direction in which the movable core moves,
for each outflow passage, a maximum inner diameter is defined in a cross section perpendicular to a direction in which the outflow passage extends,
each outflow passage has a stationary-core-side edge and a valve-body-side edge at an opening part thereof from the movable core,
a distance by which the movable core is caused to move by the electromagnetic coil is within a range of 0.1 times to 0.3 times the maximum inner diameter,
a protrusion height of the valve seat is 0.3 times the maximum inner diameter, and
the gas accumulation space is formed such that, in a state in which the valve body sits on the valve seat, the gas accumulation space includes
(1) a region located away from the movable core by a distance 0.5 times the maximum inner diameter, as seen along a line extended from the stationary-core-side edge of each outflow passage in the direction in which the outflow passage extends, and
(2) a region located away from the movable core by a distance equal to the maximum inner diameter, as seen along a line extended from the valve-body-side edge of each outflow passage in the direction in which the outflow passage extends.

2. The solenoid valve according to claim 1, wherein the outflow passages are two outflow passages branched from the inflow passage in symmetric directions,
a cross-sectional area of each outflow passage perpendicular to a direction in which the outflow passage extends is 0.9 times to 1.1 times a cross-sectional area of the inflow passage perpendicular to a direction in which the inflow passage extends.

3. The solenoid valve according to claim 1, wherein a cross-sectional area of the gas discharge passage perpendicular to a direction in which the gas discharge passage extends is 0.8 times to 1.2 times a cross-sectional area of the inflow passage perpendicular to a direction in which the inflow passage extends.

4. The solenoid valve according to claim 1, wherein
the columnar body is formed by separate members,
the valve seat is formed on one of the separate members, and
another of the separate members is configured to guide the movement of the movable core.

5. The solenoid valve according to claim 1, wherein
an outside profile shape of the valve seat is a frustoconical shape having an apex angle of 45 degrees to 75 degrees.

6. The solenoid valve according to claim 5, wherein
the gas accumulation space has a shape of rotational symmetry around an axis of the valve seat.

7. The solenoid valve according to claim 6, wherein
an outer diameter of the gas accumulation space is substantially uniform in the direction in which the movable core moves, and
an end surface of the gas accumulation space away from the stationary core is flat except for the valve seat.

8. The solenoid valve according to claim 1, wherein
the protrusion height of the valve seat is 0.5 times the maximum inner diameter, and
the gas accumulation space is formed such that, in a state in which the valve body sits on the valve seat, the gas accumulation space includes
(1) a region located away from the movable core by a distance 0.8 times the maximum inner diameter, as seen along a line extended from the stationary-core-side edge of each outflow passage in the direction in which the outflow passage extends, and
(2) a region located away from the movable core by a distance 1.5 times the maximum inner diameter, as seen along a line extended from the valve-body-side edge of each outflow passage in the direction in which the outflow passage extends.

9. The solenoid valve according to claim 1, wherein the acute angle is of 25 degrees to 75 degrees.

* * * * *